United States Patent
Satake et al.

(10) Patent No.: US 9,385,498 B2
(45) Date of Patent: Jul. 5, 2016

(54) CRIMP MACHINE AND CRIMP SYSTEM

(75) Inventors: Shuuji Satake, Susono (JP); Akiyoshi Kanazawa, Susono (JP); Ken Ito, Susono (JP); Yoshimitsu Maejima, Susono (JP); Kazuya Tsubaki, Susono (JP); Kazuhiro Kubota, Susono (JP)

(73) Assignee: Yazaki Corporation, Tokyo (JP)

(*) Notice: Subject to any disclaimer, the term of this patent is extended or adjusted under 35 U.S.C. 154(b) by 239 days.

(21) Appl. No.: 14/112,736

(22) PCT Filed: Apr. 17, 2012

(86) PCT No.: PCT/JP2012/060312
§ 371 (c)(1),
(2), (4) Date: Oct. 18, 2013

(87) PCT Pub. No.: WO2012/144479
PCT Pub. Date: Oct. 26, 2012

(65) Prior Publication Data
US 2014/0053395 A1    Feb. 27, 2014

(30) Foreign Application Priority Data
Apr. 22, 2011  (JP) .................. 2011-095943

(51) Int. Cl.
*H01R 43/042* (2006.01)
*H01R 43/048* (2006.01)
*H04L 29/12* (2006.01)

(52) U.S. Cl.
CPC ............ *H01R 43/042* (2013.01); *H01R 43/048* (2013.01); *H01R 2201/26* (2013.01); *H04L 61/2038* (2013.01); *Y10T 29/53235* (2015.01)

(58) Field of Classification Search
CPC .... H01R 43/00; H01R 43/048; H01R 43/052; H01R 43/042; H01R 2201/26; H04L 61/2038; Y10T 29/53235
See application file for complete search history.

(56) References Cited

U.S. PATENT DOCUMENTS

| | | | |
|---|---|---|---|
| 4,653,159 A * | 3/1987 | Henderson ....... | H01B 13/01245 140/93 R |
| 4,653,160 A | 3/1987 | Thorkildsen et al. | |
| 5,153,839 A * | 10/1992 | Cross ............... | G05B 19/41835 29/33 M |

(Continued)

FOREIGN PATENT DOCUMENTS

| CN | 1193580 A | 9/1998 |
|---|---|---|
| JP | 10-006748 A | 1/1998 |

(Continued)

OTHER PUBLICATIONS

First Office Action issued May 6, 2015 in corresponding Chinese Patent Application No. 201280019827.6.

(Continued)

*Primary Examiner* — Carl Arbes
(74) *Attorney, Agent, or Firm* — Locke Lord LLP (57) ABSTRACT

Disclosed is a crimp machine capable of eliminating product management for a relay connector per an ID. In the crimp machine, by a power source line, a ground line, and a signal line being positioned between a terminal mount table to which a crimp connector disposed in the relay connector is mounted and a crimp blade, and by the crimp blade being move close to a terminal mount table, the power source line, the ground line, and the signal line are thus crimped, wherein a connection terminal is disposed on the terminal mount table and an ID is made to output from the connection terminal.

1 Claim, 7 Drawing Sheets

(56) References Cited

U.S. PATENT DOCUMENTS

| | | | |
|---|---|---|---|
| 5,970,609 A | 10/1999 | Shioda | |
| 6,141,867 A * | 11/2000 | Fukada | H01R 43/20 29/33 M |
| 6,169,934 B1 * | 1/2001 | Nakayama | H01B 13/01218 29/33 F |
| 6,658,312 B1 * | 12/2003 | Hagiyama | H01R 43/28 29/33 F |
| 7,899,954 B2 | 3/2011 | Kanazawa et al. | |
| 8,442,664 B1 * | 5/2013 | Guglielmo | H01R 43/28 29/33 M |

FOREIGN PATENT DOCUMENTS

| | | |
|---|---|---|
| JP | 2005-269468 A | 9/2005 |
| JP | 2008-225673 | 9/2008 |
| WO | WO-03/045616 A1 | 6/2003 |
| WO | WO-2004/109461 A2 | 12/2004 |

OTHER PUBLICATIONS

Supplementary European Search Report dated Sep. 10, 2014, issued for the European patent application No. 12774619.6.

International Search Report dated Jul. 17, 2013, issued for PCT/JP2012/060312.

* cited by examiner

CRIMP MACHINE AND CRIMP SYSTEM

TECHNICAL FIELD

This invention relates to crimp machines and crimp systems, in particular to crimp machine and crimp system including the crimp machine that crimp electric wire and crimp connector mounted in a plurality of communication devices to communicate via the electric wire.

BACKGROUND ART

To such automobiles or fright cars various types of electric devices composing air conditioners, wipers, or power windows are mounted. These electric devices are electrically connected with electric control units (ECU) composed of such computers, and from or to these electric devices and the ECUs electric powers or control signals are transmitted.

Figure 7:
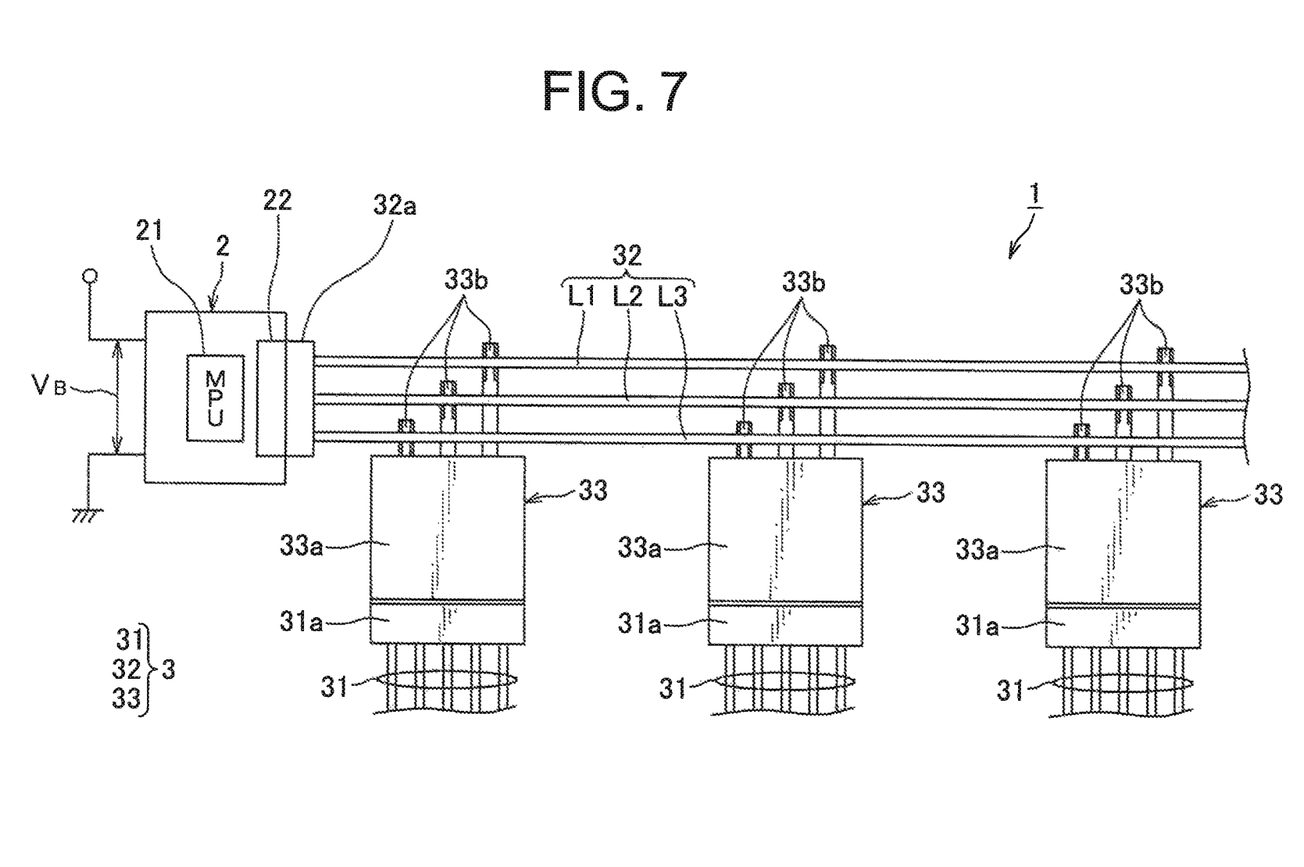
FIG. 7 is a configuration diagram illustrating an electric control system in which a wire harness structure manufactured using the crimp system shown in FIG. 1 is mounted.

Conventionally, as electric control system controlling the aforementioned electric devices, for example, what is as shown in FIG. 7 is advocated (such as PTL 1). As shown in the figure, the electric control system 1 is provided with a single ECU 2, and a plurality of relay connectors 33 as communication device, a not-shown plurality of electric devices each connected to the relay connector 33. These ECU 2 and relay connectors 33 are commonly connected to one second wire harness 22.

The second wire harness 32 is composed of three lines of a electric power line L1, a ground line L2, and a signal line L3. The EUC 2 and the plurality of relay connectors 33 are commonly connected to the electric power line L1, the ground line L2, and the signal line L3.

The aforementioned relay connectors 32 communicate with the EUC 3 via the signal line L3, and controls a not-shown electric device connected with the relay connector based on the communication. Note that in the relay connectors 33 not-shown CPUs are each incorporated that wholly controls the relay connectors 33.

Thus, in order to connect the one signal line L3 to the ECU 2 and the relay connectors 33 to communicate, ID is set to each relay connector 33 as an identification data. And the relay connector 33 each transmits the signal accompanied with the IDs of a source and itself and receives the signal accompanied with its own ID.

No set of the aforementioned ID disables communication with the ECU 2 and the plurality of relay connector 33 connected with the one signal line L1, and thus it is indispensable to set the IDs. conventionally, as such set of the aforementioned IDs, for example, in the housing of the relay connector 33 a plurality of ID setting switches is mounted, or in not-shown non-volatile memory disposed in the relay connector 33 each ID is stored upon manufacturing.

Figure 8A:
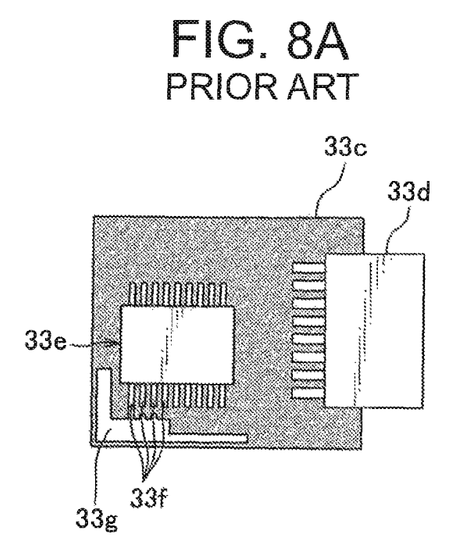
FIGS. 8A, 8B and 8C are configuration diagrams illustrating one example of a conventional relay connector.

Disadvantageously, a method of the aforementioned setting of ID requires product management every ID. Furthermore, the same appearance results in misconnection because of indiscrimination of the relay connector 33 from each other and uncontrollability, and may cause product defects. It is then, for example, conceivable to make the relay connector 33 such configuration as shown in FIG. 8A. The relay connector 33 is provided with a circuit board 33c, a connector 33d mounted on the circuit board 33c, and a IC chip 33e mounted on the circuit board 33c and having a CPU incorporated therein.

Figure 8B:
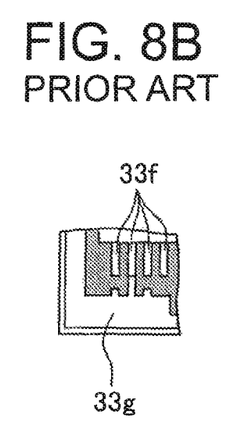
Figure 8C:
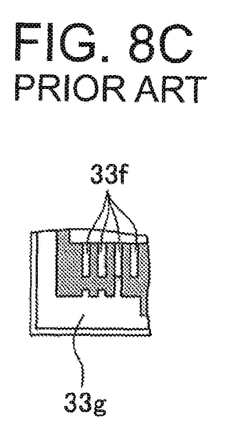

This IC chip 33e is supposed to be provided with a plurality of ID setting terminals 33f other than a terminal for communication or supplying power, and as shown in FIGS. 8B and 8C, changing of the number or position between the ID setting terminals 33f and wiring 33g of ground or power source is supposed to allow the ID to be set. In this case, observation of pattern of wiring 33g can discriminate the relay connectors 33 from each other, there is required that the circuit boards 33c of which pattern is different every ID are each prepared, and thereby the problem has not yet been resolved that product management is required every ID.

CITATION LIST

Patent Literature

[PTL 1]
Japanese Patent Application Laid-Open Publication No. 2008-225673
[PTL 2]
Japanese Patent Application Laid-Open Publication No. H10-6748

SUMMARY OF INVENTION

Technical Problem

Therefore, it is an object of the invention to provide a crimp machine and a crimp system that can eliminate the communication device from product management every identification data.

Solution to Problem

In order to resolve the aforementioned problems, the invention of one aspect provides a crimp machine for crimping an electric wire and a crimp connector mounted to a plurality of communication devices communicating via the electric wire, the crimp machine including: a terminal mount table to which the crimp connector is to be mounted; a crimp member movable close to and away from the terminal mount table, wherein the electric wire is crimped to the crimp connector by the electric wire being positioned between the terminal mount table and the crimp member, and by the crimp member being moved close to the terminal mount table; a connection terminal disposed to the terminal mount table and arranged to be electrically connected to the crimp connector mounted to the terminal mount table; and an identification data setup device allowing the connection terminal to output an identification data.

Preferably, the connection terminal is provided with a connection pin projecting from the terminal mount table toward the crimp connector and a spring biasing the connection pin toward the crimp connector.

The invention of another aspect provides a crimp system for crimping an electric wire and a crimp connector mounted to a plurality of communication devices communicating via the electric wire, the crimp system including: the plurality of crimp machines as recited in the one aspect and disposed per the plurality of communication devices, wherein the plurality of crimp machines outputs from each of the connection terminals an identification date different from each other.

Advantageous Effects of Invention

According to the invention related to the one aspect, since the connection terminal is disposed in the terminal mount table to which crimp connector disposed in the communication device is mounted, from which identification data is outputted, when the crimp connector of the communication device is crimped with the electric wire the identification data can be set. It follows from this that before crimping, the plurality of communication devices can commonly be used and that the communication device is eliminated from product management every identification data.

According to the invention, since the connection terminal is provided with a connection pin projecting from the terminal mount table toward the crimp connector and a spring biasing the connection pin toward the crimp connector, the crimp connector and the connection terminal mounted to the terminal mount table are electrically secured.

According to the invention, since the crimp machine is disposed every communication device, the identification data is prevented from incorrect setting.

DESCRIPTION OF EMBODIMENTS

Figure 1:
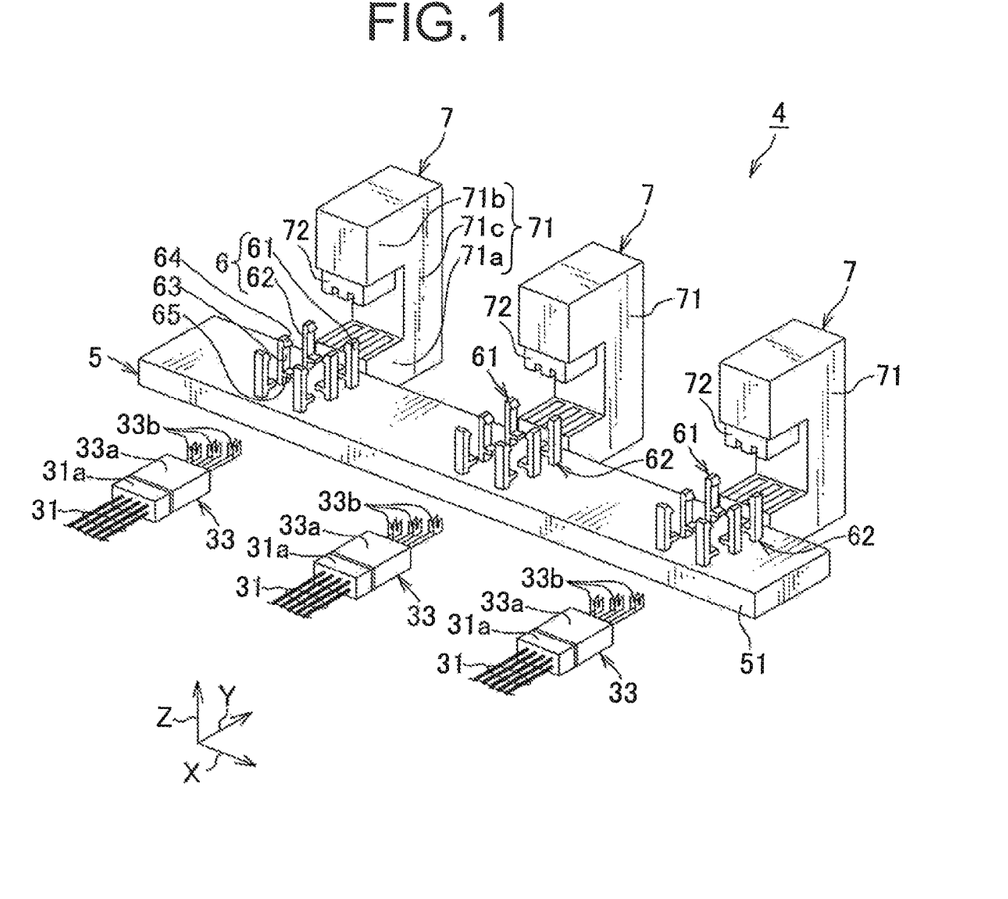
FIG. 1 is a perspective view illustrating a crimp system to which a crimp machine is mounted according to one embodiment of the invention.

In the first place, before discussing a crimp machine and a crimp system of the invention, with reference now to FIG. 7 a wire harness structure manufactured using these crimp machine and crimp system are discussed. FIG. 7 is a configuration diagram illustrating an electric control system 1 in which a wire harness structure manufactured using the crimp system shown in FIG. 1 is mounted.

The electric control system 1 shown in FIG. 7 is mounted to not-shown vehicle. This electric control system 1 is provided with a plurality of not-shown electric devices, an electric control unit 2 (hereinafter referred to as ECU), and a wire harness structure 3 connecting the plurality of electric devices and the ECU 2 to communicate.

The electric device is various types of devices controlled by the ECU 2 and various types of switches for such as an air conditioner, and enumerated are for example a wiper, a powered window, or a door switch. An electric power $V_B$ from car mounted battery is applied to the ECU 2. The ECU 2 is provided with a micro processor (MPU) 21, and an external connector 22 to be connected with the wire harness structure mentioned later.

The MPU 2, when "on" information of the switch is inputted from a relay connector 33 as a communication device mentioned later, outputs control signal to which an ID (identification data) of the electric device corresponding to the operation switch and an ID of the relay connector 33 are appended as an address data, to which the electric device is connected.

The external connector 22 is connected to the MPU 21. The external connector 22 includes therewithin communication protocol (for instance, LIN (Local Interconnect Network)) corresponding to such predefined communication protocol for multiply communicating with a plurality of relay connectors mentioned below. The external connector 22 is provided with a power source terminal from which plus of the power source voltage $V_B$ is outputted, a ground terminal from which minus of the power source VB is outputted, and a signal terminal (not shown) connected to the aforementioned communication interface, from which the control signal is outputted.

The wire harness structure 3 is provided with a plurality of first wire harnesses 31, a second wire harness 32, and a plurality of relay connectors 33.

The plurality of first wire harnesses 31 is each provided with a plurality of electric wires that connects each electric device and rely connector 33, at one end of which a connector 31a connected to the relay connector 33, at the other end of which a not-shown connector connected to the electric device is provided.

The second wire harness 32 is composed of a power source line L1 connected to the power source terminal of the forgoing external connector 22, a ground line L2 connected to the ground terminal, and a signal line L3 connected to the signal terminal, via which control signals addressed to each relay connector 33 are multiplied and transmitted (in serial).

The connection connector 32a is attached to one end of the second wire harness 32, and when this connection connector 32a is connected to the external connector 22, the power source terminal of the external connector 22 is connected to the power source line L1, the ground terminal the ground line L2, and the signal terminal the signal line L3. Furthermore, the plurality of relay connectors 33 is connected to the second wire harness 32.

The relay connector 33 is the one which connects the first wire harness 31 and the second wire harness 32. The relay connector 33 is provided with a synthetic-made outer housing 33a formed into a rectangular column shape, three crimp connectors 33b projecting from one opening of the outer housing 33a in a longitudinal direction, a plurality of male tub terminals (not shown) received within a hood (not shown) disposed at the other end of the outer housing 33a in the longitudinal direction and so on.

The outer housing 33a receives therewithin a not-shown resin seal. The resin seal is resin-sealed with a not-shown chip in which a CPU controlling whole the relay connector 33 is incorporated and one end of the crimp connector and the male tub being connected to each other by wire-bonding.

The three crimp connectors 33b are made of conductive metal, one end of which is inserted into a not-shown resin seal, the other end of which projects through the outer housing 33a to external. two pairs of crimp blades are disposed to the other end projecting to external of these three crimp connectors 33b which are made of two crimp blades arranged spaced from each other in its projecting direction. When the power source line L1, the ground line L2, and the signal line L3 are inserted into between the two pairs of crimp blades disposed to this crimp connector s 33b, covering parts of the power source line L1, the ground line L2, and signal line L3 are cut, and thus inner core and the crimp blade are crimped. The foregoing male tub terminal is made of conductive metal, and when the connector 31a is engaged with the not-shown hood that is disposed to the outer housing 33a, the female terminal within the connector 31a is electrically connected.

Figure 2:
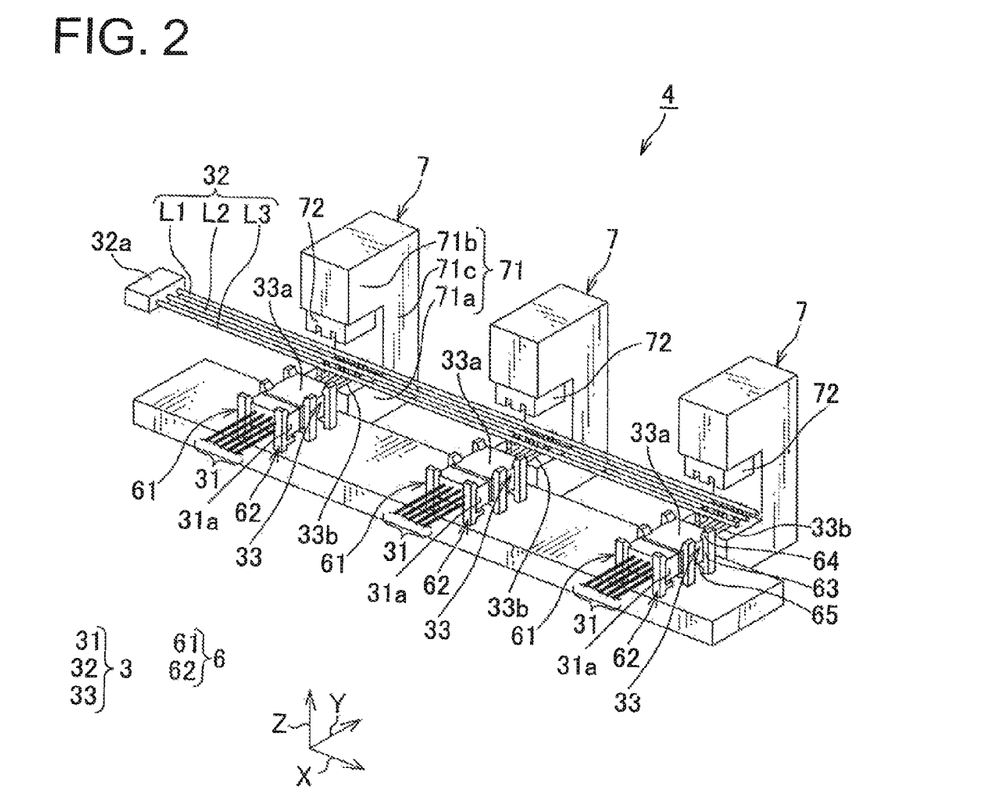
FIG. 2 is a perspective view illustrating a state in which a second wire harness and a relay connector are set to the crimp system shown in FIG. 1.
Figure 3:
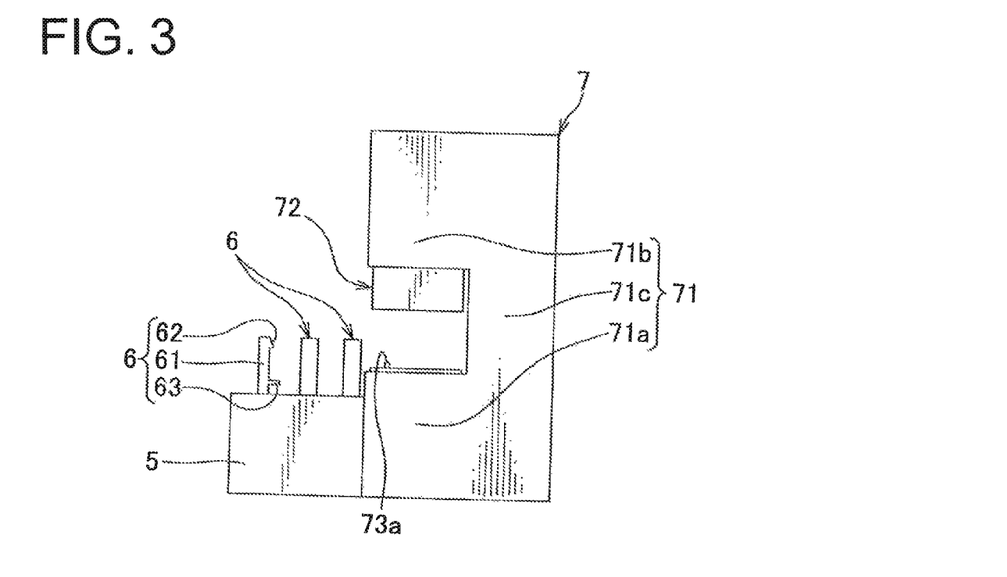
FIG. 3 is a side view illustrating the crimp system shown in FIG. 1.
Figure 4A:
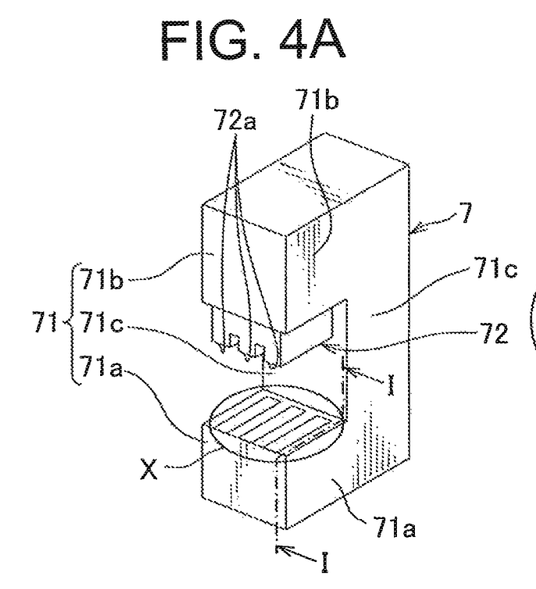
FIG. 4A is a perspective view illustrating the crimp machine shown in FIG. 1.
Figure 4B:
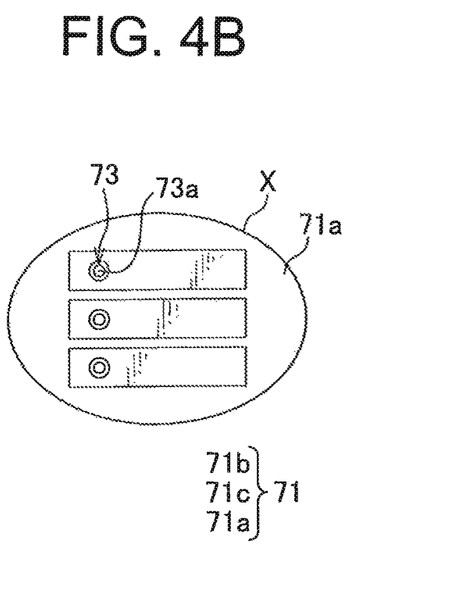
FIG. 4B is a partially-enlarged view of X portion in FIG. 4A.
Figure 5A:
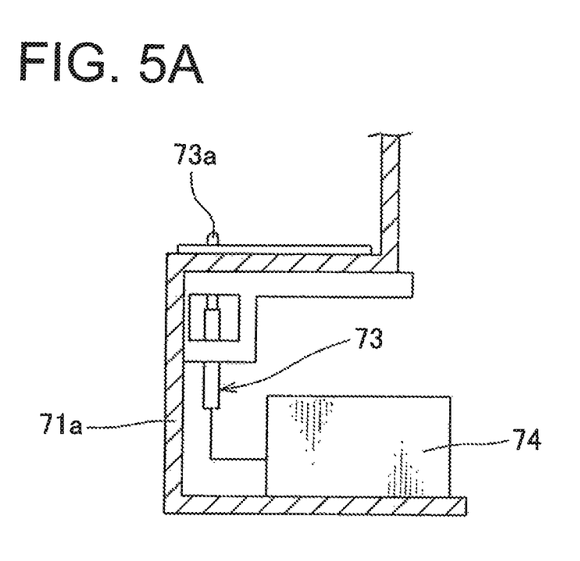
FIG. 5A is a partially-cross-sectional view taken from I-I line in FIG. 4A.
Figure 5B:
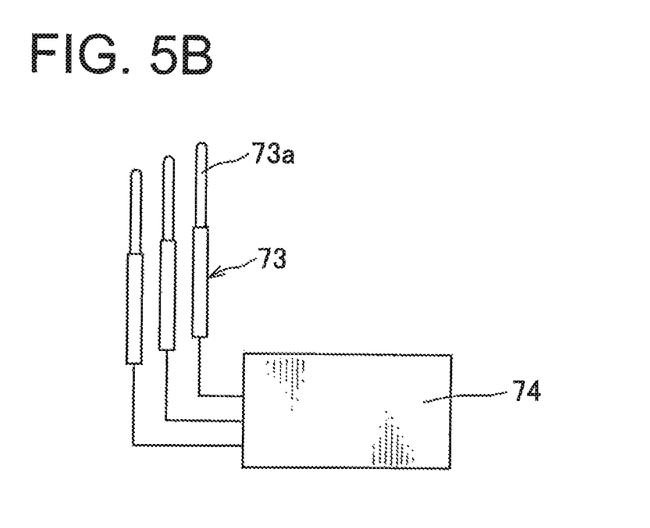
FIG. 5B is a schematic view illustrating a connection terminal and an ID setting device shown in FIG. 4A.

Then, with reference now to FIGS. 1 to 5, hereinafter described is a crimp system of the invention manufacturing the wire harness structure 3 crimping the foregoing second wire harness 32 and the crimp connector 33b disposed to the plurality of relay connectors 33 communicating via the second wire harness 32. FIG. 1 is a perspective view illustrating one embodiment of a crimp system to which a crimp machine is mounted according to one embodiment of the invention. FIG. 2 is a perspective view illustrating a state in which a second wire harness and a relay connector are set to the crimp system shown in FIG. 1. FIG. 3 is a side view illustrating the crimp system shown in FIG. 1. FIG. 4A is a perspective view illustrating the crimp machine shown in FIG. 1, FIG. 4B is a partial enlarged view of X portion in FIG. 4A. FIG. 5A is a partial cross-sectional view taken from I-I line in FIG. 4A, and FIG. 5B is a schematic view illustrating a connection terminal and an ID setting device shown in FIG. 4A.

As shown in FIGS. 1 and 2, the crimp system 4 is provided with a housing fixing table 5 made of elongated plate, a plurality of pairs of fixing arms 6 fixing the outer housing 33a or the connector 31a of the relay connector 33, and a crimp machine 7 arranged at one side in a width direction of the housing fixing table 5 and in a longitudinal direction thereof in the plural. Hereinafter, the arrow X direction in FIGS. 1 and 2 is referred to as a length direction of the housing fixing table 5, the arrow Y as a width direction of the housing fixing table 5, the arrow Z as a thickness direction of the housing fixing table 5.

The foregoing housing fixing table 5 is arranged on a floor in a factory. The paired fixing arms 6 is composed of a pair of fixing arms 61, 62 opposed to the longitudinal direction X. The fixing arms 61, 62 are each provided with a bar-like arm body 63 projecting from the housing fixing table 5, and a latch stop 64 and a fixing part 65 projecting from a side of the arm body 63 spaced from each other. The latch stop 64 is disposed projecting on an end side of the arm body 63 away from the housing fixing table 5. The fixing part 65 is disposed projecting from a side of the arm body 63 near the housing fixing table 5 in the same direction as the latch stop 64.

The paired fixing arms 6 is disposed in three pairs every crimp machine 7. These three pairs of fixing arms 6 are arranged in parallel to the width direction Y. In the fixing arms 61, 62 composing the two pairs of fixing arms 6 near the crimp machine 7, the fixing part 65 and the latch stop 64 are arranged projecting in a direction approaching each other. In the fixing arms 61, 62 composing the pair of fixing arms 6 away from the crimp machine 7, the fixing part 65 and the latch stop 64 are arranged projecting in a direction approaching the crimp machine 7.

When the outer housing 33a of the relay connector 33 and the connector 31a disposed at a distal end of the first wire harness 31 are connected to each other, and these outer housing 33a and connector 31a are inserted into between the fixing arm 61 and the fixing arm 62 composing the two pairs of fixing arms 6 arranged near the crimp machine 7 and between the pair of fixing arms 61 arranged away from the crimp machine 7 and the crimp machine 7, the two pairs of fixing arms 6 near the crimp machine 7, as shown in FIG. 2, each positions the outer housing 33a in the length direction X between the arm bodies 63. The two pairs of fixing arms 6 near the crimp machine 7 each positions the outer housing 33a in the thickness direction Z between the fixing part 65 and the latch stop 64. The pair of fixing arms 6 away from the crimp machine 7 positions the outer housing 33a and the connector 31a in the width direction Y between the crimp machine 7. The pair of fixing arms 6 away from the crimp machine 7 positions the connector 31a in the thickness direction Z between the fixing part 65 and the latch stop 64. This allows the outer housing 33a of the relay connector 33 and the connector 31a disposed to the distal end of the first wire harness 31 to be secured.

The foregoing crimp machine 7 is disposed every relay connector 33 to be connected to the first wire harness 31. The crimp machine 7 is provided with a machine main body 71 arranged in a U-shape, and a crimp blade 72 movably attached to the machine main body 71. The machine main body 71 is provided with a box-like terminal mount table 71a to which the crimp connector 33b is to be mounted, a blade holder 71b arranged separated in the thickness direction Z relative to this terminal mount table 71a and holding a crimp blade 72 mentioned later, and a coupling part 71c coupling these terminal mount table 71a and blade holder 71b.

As shown in FIGS. 5A, 5B, accommodated in the terminal mount table 71a are three connection terminals 73 to be each connected to three crimp connectors 33b mounted to the terminal mount table 71a, and an ID setting device 74 as a identification data setting means allowing this connection terminal 73 to output an ID data. The connection terminal 73 is provided with a connection pin 73a (FIGS. 3 to 5B) projecting from the terminal mount table 71a toward the crimp connector 33b, and a not-shown spring biasing the connection pin 73a toward the crimp connector 33b. The connection pin 73a is held by this spring movably in a direction engaging or disengaging the crimp blade 72. In the terminal mount table 71a a hole for connection pin 73a is provided, from which a tip of the connection pin 73a projects outside the terminal mount table 71a.

The foregoing ID setting device 74 outputs the ID data different from every crimp machine 7 from the three connection terminals 73. For instance, the ID setting device 74 disposed to the crimp machine 7 to crimp the relay connector 44 at node 0 outputs the ID of 000 setting all the three connection terminals 73 low. The ID setting device 74 disposed to the crimp machine 7 to crimp the relay connector 44 at node 1 also outputs the ID of 001 setting the rightmost of the three connection terminals 73 high, the remaining terminals low.

The blade holder 71b holds the crimp blade 72 operable to engage or disengage the terminal mount table 71a. To the crimp blade 72 three blade parts 72a (FIG. 4) are arranged projecting in an arrangement direction of the three crimp connectors 33b (that is, the length direction X) spaced from reach other. These three blade parts 72a, when approaching the terminal mount table 71a, are inserted into between the two pair of crimp blades disposed in the crimp connector 33b, which crimps the power source line L1, the ground line L2, and the signal line L3 composing the second wire harness 32 to each crimp blade of the crimp connector 33b.

Figure 6A:
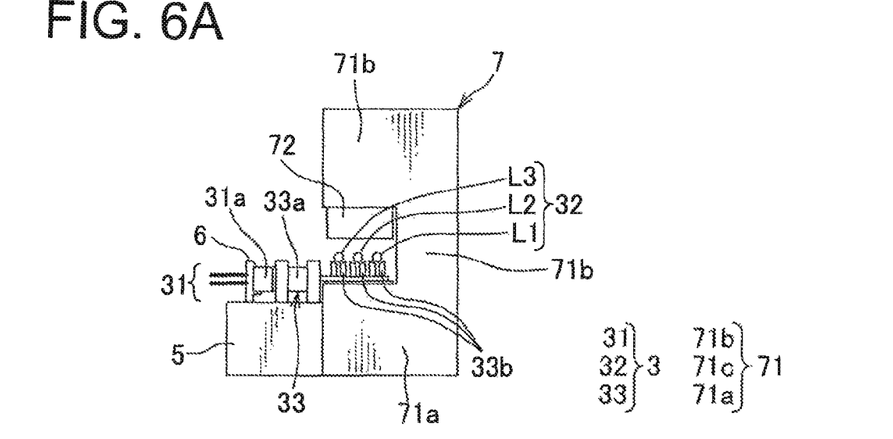
FIG. 6A is an explanatory view illustrating crimp procedure using the crimp system shown in FIG. 1.

Then, a procedure of manufacturing the wire harness structure 3 of the foregoing crimp system 4 is hereinafter discussed. First, the connector 31a disposed in the distal end of the first wire harness 31 is connected to the relay connector 33. Then, the relay connector 33 and the connector 31a that are connected to each other are fixed by the paired fixing arms 6. Then, as shown in FIG. 6A, the crimp connector 33b of the relay connector 33 is mounted to the terminal mount table 71a of the crimp machine 7, and the crimp connector 33b and the connection pin 73a are connected. And the power source line L1, the ground line L2, and the signal line L3 composing the second wire harness 32 are positioned on the crimp blade.

Figure 6B:
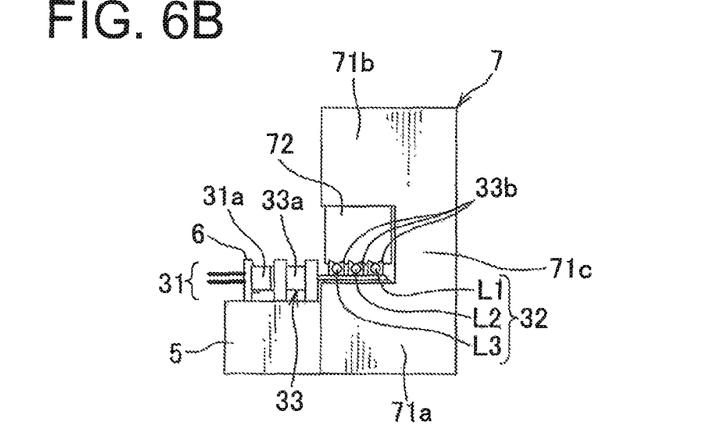
FIG. 6B is an explanatory view illustrating crimp procedure using the crimp system shown in FIG. 1.

Then, as shown in FIG. 6B, the crimp blade 72 is moved close to the terminal mount table 71a. This allows the blade part 72a of the crimp blade 72 to push the power source line L1, the ground line L2, and the signal line L3, and thus the power source line L1, the ground line L2, and the signal line L3 are crimped to the crimp connector 33b. In this condition, between the power source line L1 and the ground line L2 power source voltage $V_B$ is applied to. Application of the power source voltage $V_B$ enables the CPU incorporated in each relay connector 33 to operate.

The CPU in the rely connector 33, when an ID set flag is inactivated that is stored in, e.g., a not-shown non-volatile memory, reads the ID inputted to the crimp connector 33b, performs an ID setting to set the read ID as a self ID, and then the ID set flag is activated. A program performing generally communication program without setting the ID setting, if the ID set flag is inactivated, is provided.

Figure 6C:
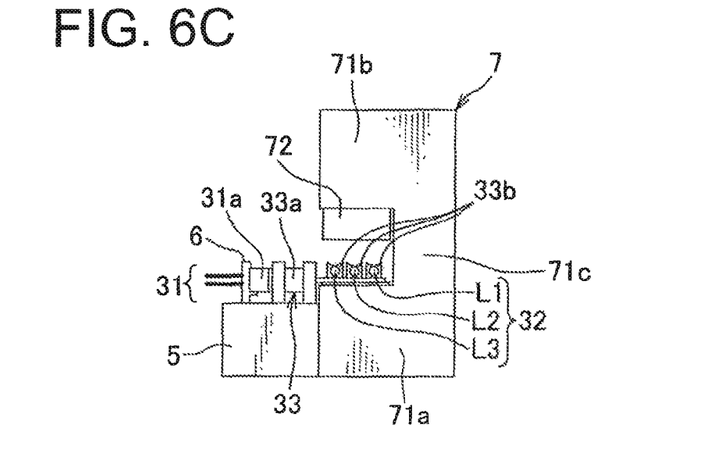
FIG. 6C is an explanatory view illustrating crimp procedure using the crimp system shown in FIG. 1.

As mentioned above, since the ID set flag is kept inactivated while the crimp system 4 crimps, the CPU in the relay connector 33 performs ID setting. Then, as shown in FIG. 6C, the crimp blade 72 is separated from the terminal mount table 71a, the outer housing 33a is removed from the paired fixing arms 6, and thus the wire harness structure 3 is assembled.

In the foregoing crimp machine 7, the connection terminal 73 is disposed to the terminal mount table 71a to which the crimp connector 33b disposed in the relay connector 33 is mounted, this connection terminal 73 is made to output the ID, and thus it is made possible to set the ID when the crimp connector 33b of the relay connector 33 is crimped to the power source line L1, the ground line L2, and the signal line L3. It follows from this that before crimping the plurality of relay connectors 33 can be commonly used and that there is eliminated product management for the relay connectors 33 per ID.

In the foregoing crimp machine 7, since the connection terminal 73 is provided with the connection pin 73a projecting from the terminal mount table 71a toward the crimp connector 33b and the not-shown spring biasing the connection pin 73a toward the crimp connector 33b, the crimp connector 33b and the connection terminal 73 mounted to the terminal mount table 71a are electrically secured.

The foregoing crimp system 4 prevents incorrect setting of the ID by the crimp machines being provided every relay connector 33.

It should be noted that in the foregoing crimp system 4 the crimp machine 7 is provided every relay connector 33, this invention is not limited to this embodiment. For instance, using one crimp machine 7 the relay connector 33 may subsequently be crimped. In this case, the ID outputted from the connection terminal 73 of the crimp machine 7 is made changed every time the relay connector 33 is crimped.

Furthermore, according to the foregoing embodiment, the not-shown resin seal is housed in the outer housing 33a of the relay connector 33, the IC chip and the crimp connector 33b or the tub-like terminal are wire-bonded to be connected, the invention is not limited to this embodiment. For instance, in the outer housing 33a of the relay connector 33 a board is housed, on which the IC chip and the crimp connector 33b or the tub-like terminal may be connected.

Furthermore, the aforementioned embodiments are merely exhibited as a typical embodiment of the present invention, and the invention is not limited to these embodiments. Namely, unless otherwise such changes and modifications depart from the scope of the present invention hereafter defined, they should be construed as being included therein.

REFERENCE SIGNS LIST 7 crimp machine
33 relay connector (communication device)
33b crimp connector
71a terminal mount table
72 crimp blade (crimp member)
73 connection terminal
73a connection pin
74 ID setting device (identification data setting means)
L1 power source line
L2 ground line
L3 signal line

The invention claimed is:

1. A crimp system for crimping an electric wire and a crimp connector mounted on a plurality of communication devices communicating via the electric wire, the crimp system comprising:
 a plurality of crimp machines disposed per the plurality of communication devices, each crimp machine comprising:
 a terminal mount table on which the crimp connector is to be placed;
 a crimp member movable close to and away from the terminal mount table,
 a connection terminal housed in the terminal mount table,
 an electrical identification data setup device housed in the terminal mount table,
 wherein
 the electric wire is crimped to the crimp connector by positioning the electric wire between the terminal mount table and the crimp member, and by moving the crimp member close to the terminal mount table,
 the connection terminal is electrically connected to the crimp connector placed on the terminal mount table, and
 the electrical identification data is output from the electrical identification data setup device via the connection terminal to the crimp connector of each communication device, and
 wherein the plurality of crimp machines outputs from each of the connection terminals an identification date different from each other.

* * * * *